April 20, 1954   R. C. RUHLAND   2,675,710
MULTIPLE SPEED CHART PAPER DRIVE TRANSMISSION
Filed Nov. 16, 1951   4 Sheets-Sheet 1

*INVENTOR.*
ROMAN C. RUHLAND
BY
ATTORNEY.

April 20, 1954     R. C. RUHLAND     2,675,710
MULTIPLE SPEED CHART PAPER DRIVE TRANSMISSION
Filed Nov. 16, 1951     4 Sheets-Sheet 2

INVENTOR.
ROMAN C. RUHLAND
BY *Arthur H. Swanson*
ATTORNEY.

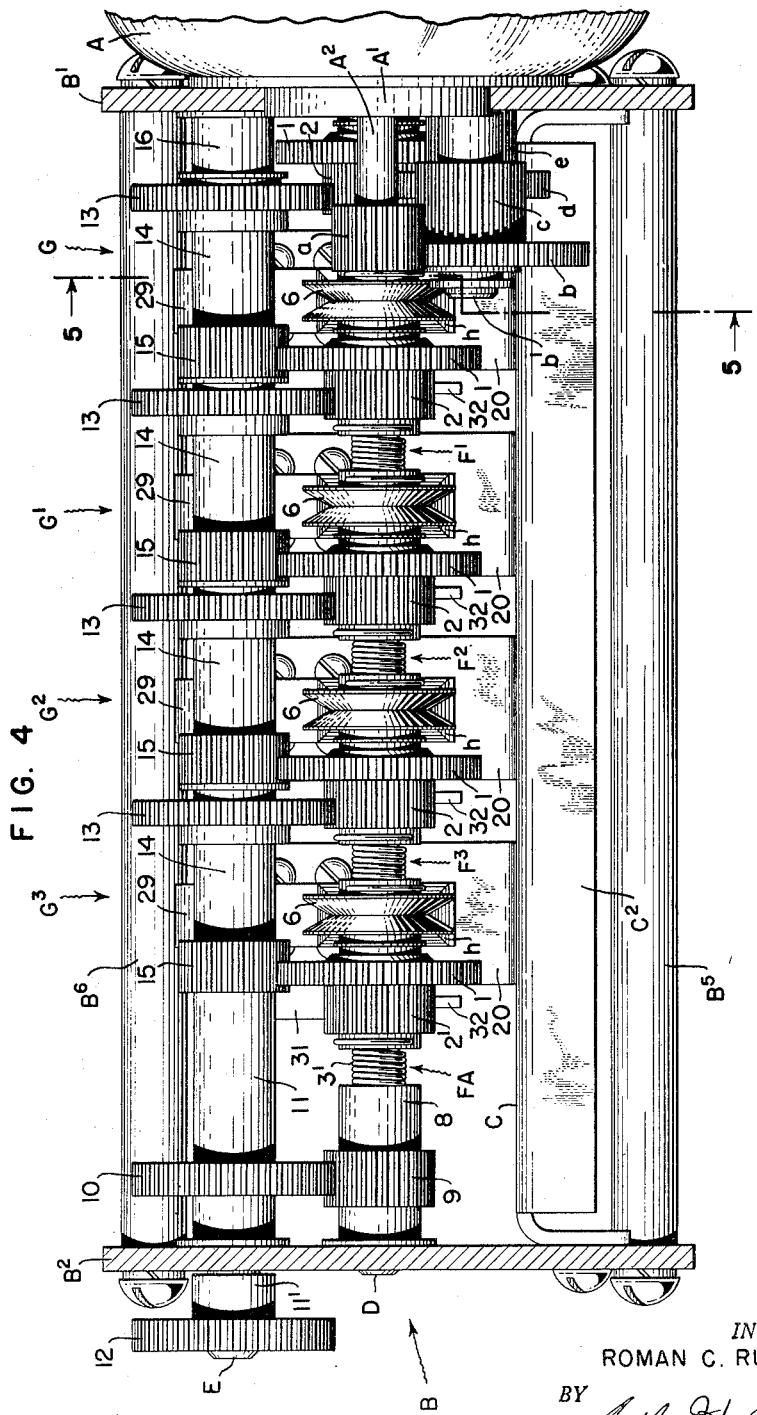

April 20, 1954     R. C. RUHLAND     2,675,710
MULTIPLE SPEED CHART PAPER DRIVE TRANSMISSION
Filed Nov. 16, 1951     4 Sheets-Sheet 4
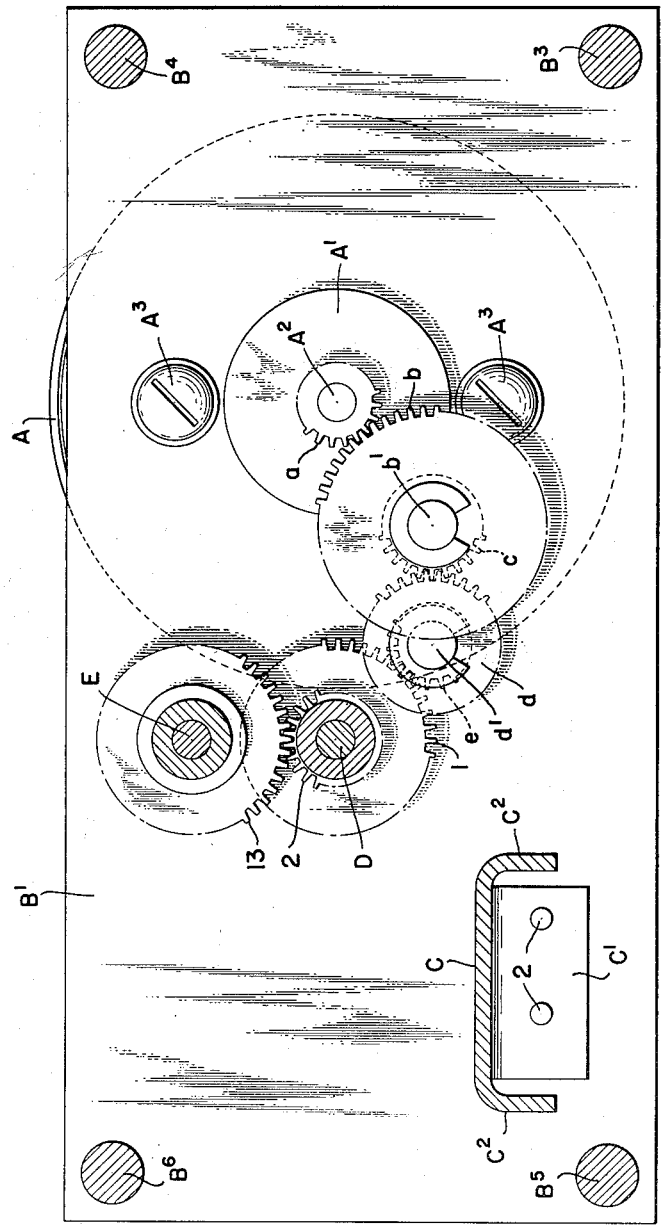
INVENTOR.
ROMAN C. RUHLAND
BY
ATTORNEY.

Patented Apr. 20, 1954

2,675,710

UNITED STATES PATENT OFFICE 2,675,710

MULTIPLE-SPEED CHART PAPER DRIVE TRANSMISSION

Roman C. Ruhland, Minneapolis, Minn., assignor to Minneapolis-Honeywell Regulator Company, Minneapolis, Minn., a corporation of Delaware Application November 16, 1951, Serial No. 256,737

5 Claims. (Cl. 74—375)

The general object of the present invention is to provide an improved, variable-speed, torque transmission well adapted for a variety of uses in which the output speed of the transmission is variable through a relatively wide range. The invention was primarily devised for use in advancing the paper record strip of a recording instrument of such character that the rate at which the record strip is advanced in regular operation may vary from a minimum of 1 inch per minute up to a maximum of 256 inches per minute.

In my prior application, Serial No. 146,345, filed February 25, 1950, I have disclosed a recording instrument adapted simultaneously to record on a travelling record strip the varying values of eight different but related quantities or conditions. In that application I suggested the use of a variable speed transmission of conventional type for advancing the record strip at one or another of three different speeds. The specific embodiment of the invention disclosed herein by way of example, is adapted to advance the record strip of my prior application at any one of the following speeds, namely, a speed per minute of 1 inch, of 4 inches, of 16 inches, of 64 inches, and of 256 inches.

While I have illustrated and described by way of example, an embodiment of the present invention operable at the will of the operator to maintain any one of five, definite, different, output speeds, each of the four higher speeds being four times the speed of the next lower speed; the principle of the invention can be used equally well when the number of the different speeds is greater or less than five, and when the magnitudes of the different speeds are quite different from those above mentioned. It is not essential, moreover, that the ratios of the different speeds should be uniform throughout the range of speed variation.

A primary object of the present invention is to provide a relatively simple and reliable transmission of the general type specified, which is characterized by its comparative simplicity, the ease with which the apparatus is controlled, and by its inclusion of numerous duplicate elements adapted for manufacture at a relatively low cost.

A specific object of the invention is to control the speed of a transmission shaft by selectively clutch connecting the shaft to one or another of a plurality of revolvable elements separately rotatable on said shaft at different speeds.

The various features of novelty which characterize my invention are pointed out with particularity in the claims annexed to and forming a part of this specification. For a better understanding of the invention, however, its advantages, and specific object attained with its use, reference should be had to the accompanying drawings and descriptive matter in which I have illustrated and described a preferred embodiment of the invention.

Of the drawings:

Fig. 4 is a section on the line 4—4 of Fig. 1;

Fig. 5 is a partial section on the line 5—5 of Fig. 4;

Figure 1:
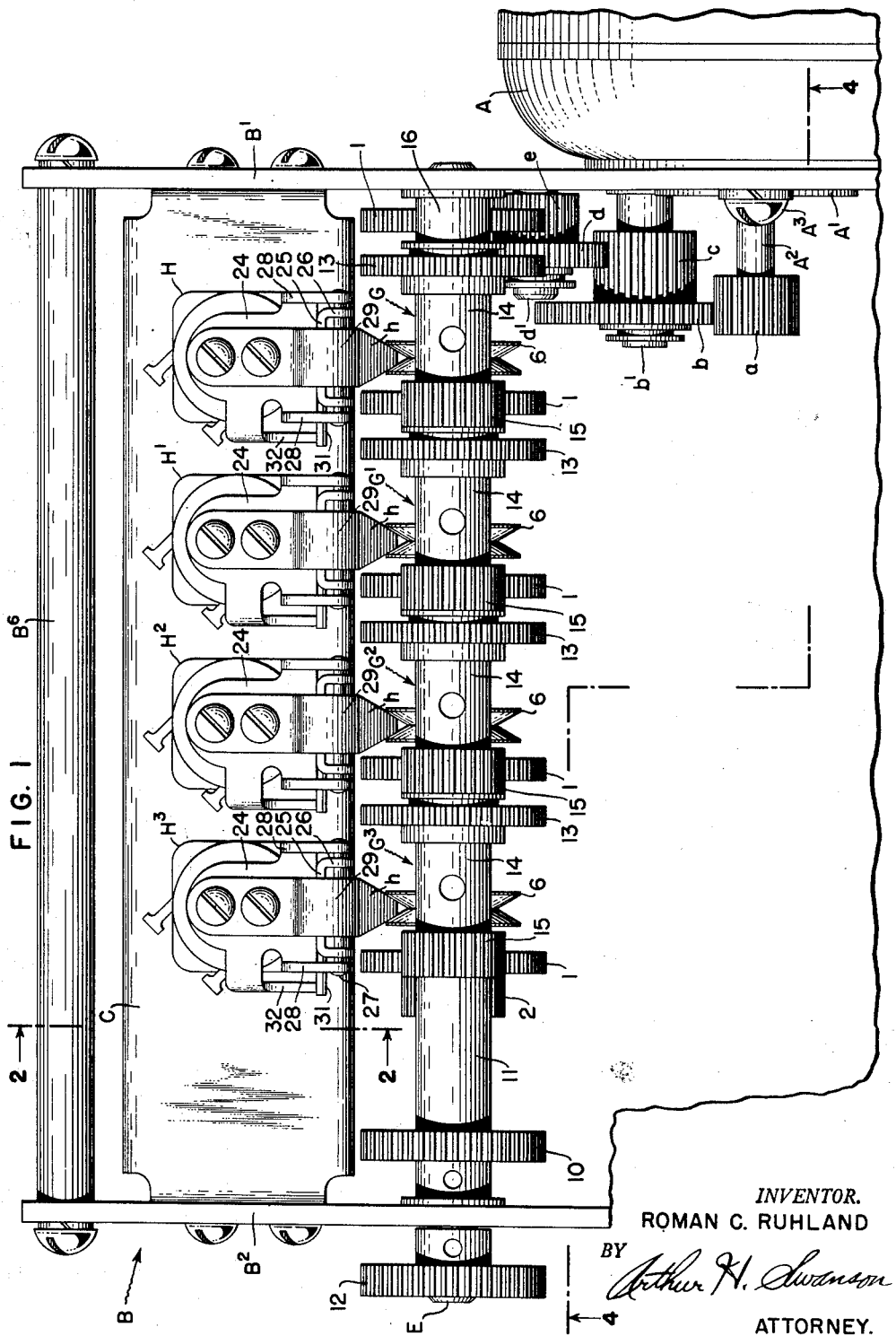
Fig. 1 is a plan view of a variable speed transmission mechanism.

The variable speed transmission mechanism disclosed by way of example in the drawings, and hereinafter described in detail, comprises an electric motor A and a chassis B supporting my novel, variable-speed transmission mechanism through which the rotation of the motor A at a constant speed may rotate a transmission output gear 12 at a selected one of a plurality of different, predetermined speeds. In the form shown, the chassis B comprises two, similar, spaced apart, rectangular side plates B' and B² which are parallel to one another. The plates B' and B² are rigidly connected by cross pieces or struts B³–B⁶, each strut connecting one corner of each side plate to the corresponding corner of the other side plate. The side plates B' and B² are also connected by a metallic, relay-supporting bar C with end flanges C' abutting against the inner sides of the plates B' and B² and bolted or screwed to the latter. As shown, the member C is a metal strip stiffened by bending its side edges to form side-by-side, transverse flanges C².

The motor A, shown in part in Figs. 1 and 4, may be a D. C. motor operating at a suitable constant speed, for example, at a speed of four thousand revolutions per minute. As shown, the motor frame or shell is formed with a circular projection A' at one end which is snugly received in a circular orifice formed for the purpose in the plate B'. The end of the motor frame or casing is rigidly attached to the plate B' by bolts or screws A³. The motor shaft A² is coaxial with the projection A', and extends away from the latter into the chassis and carries a gear $a$ at its free end. The gear $a$ forms the initial gear element in a speed reducing gear train shown in Fig. 5 as comprising the gear $a$, a large gear $b$ in mesh with the gear $a$, a pinion $c$ coaxial with and mechanically connected to the gear $b$, a gear $d$ in mesh with a pinion $c$ and mechanically connected to a coaxial pinion $e$. The gear $b$ and pinion $c$ are mounted for rotation on a stub shaft $b'$ and the gear $d$ and pinion $e$ are mounted for rotation on a stub shaft $d'$. The stub shafts $b'$ and $d'$ are secured to and extend perpendicularly away from side plate B. Gear $b$, pinion $c$, gear $d$, and pinion $e$ constantly rotate a gear 1. The latter may be regarded as the input element of the transmission mechanism proper.

Figure 6:
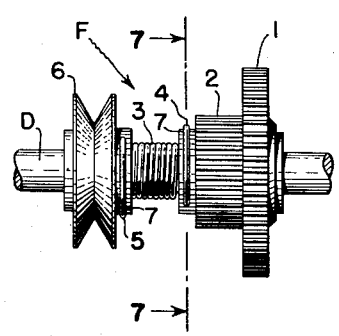
Fig. 6 is an elevation of a clutch assembly unit.
Figure 7:
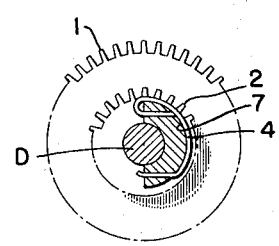
Fig. 7 is a section on the line 7—7 of Fig. 6.

The gear 1 forms the driving element of a clutch assembly unit F (Figs. 6 and 7), which surrounds a shaft D and is free to rotate about the latter except when clutched to the shaft as is hereinafter described. The shaft D has its ends journalled in the chassis side plates B' and B² and may be referred to as the transmisison input shaft. The unit F is shown in part only in Fig. 4, but is fully shown in Figs. 6 and 7. The unit F comprises the gear 1, a coaxial pinion 2 rigidly conected to the gear 1, a helical spring 3, and a wheel 6. The spring 3 surrounds the shaft D and has one end 4 secured to the pinion 2 and has its second end 5 connected to the wheel 6. The latter is loosely journalled on the shaft D. As shown in Fig. 7, the spring end 4 is soldered at 7 to the end of the pinion 2. The spring end 5 is similarly soldered to a portion of the wheel 6. The wheel 6 is formed with a V-shaped, peripheral groove arranged to receive a brake element $h$, which, when actuated, subjects the wheel 6 to a braking force. The convolutions of the spring 3 are large enough to permit the unit F to revolve freely about the shaft D except when the wheel 6 is subjected to a retarding force. When a retarding force is applied to the wheel 6, the convolutions of the spring 3 are tightened or reduced in diameter, with the result that the spring then forms a clutch connection between the shaft D and the clutch assembly unit F, and thereby causes the shaft D to rotate with said unit.

As shown in Fig. 4, the shaft D supports three additional clutch assembly elements F', F² and F³ which may be and, as shown, are duplicates of the clutch assembly element F. The elements F, F', F², and F³ are arranged end to end and extend away from the chassis wall B', in the order stated, and are in constant rotation at progressively decreasing speeds while the transmission is in operation, as is hereinafter explained. Elements FA and 8 are interposed between the elements F³ and the chassis side wall B². The element FA comprises a gear wheel 1 with an adjacent part 2' which may be a duplicate of the pinion 2 attached to the gear 1 of the element F, but the part 2' does not operate as a gear. The element FA also includes a coiled clutch spring 3' surrounding the shaft D and having one end attached to the element 2'. The other end of the spring 3' is shown in engagement with the adjacent end of the tubular element 8, but is not attached to that element. The element 8 is rotatable on shaft D and simply acts as a spacer. Gear 9 is permanently attached to and rotates with the input shaft D and may be regarded as the output element thereof.

The spring 3' differs from the spring 3 of each of the elements F, F', F², and F³, in that its convolutions are small enough in diameter to fit snugly about the shaft D and thereby cause the shaft D to rotate with the member 2' and associated gear element 1. unless the shaft D is then rotating at a speed higher than the rotating speed of the member 2', as is hereinafter more fully explained.

The previously mentioned transmission output gear 12 is secured to the portion of a shaft E adjacent but at the outer side of the plate B². The shaft E is parallel to the shaft D and is journalled in the plates B' and B² and is hereinafter referred to as the transmission output shaft. As shown, the gear 12 is spaced away from the plate B² by a collar or spacer 11' which may be rigidly attached to the shaft E. The shaft E is rotated by a gear 10 in mesh with the gear 9 mounted on the shaft D. The gear 10 is secured to the shaft E and has one end in engagement with the plate B². A sleeve 11 spaces gears 10 and 15 and is not necessarily secured to shaft E.

Interposed between the plate B' and the adjacent end of the sleeve 11, are coupling elements G, G', G², and G³ which loosely surround the shaft E and are arranged end to end at progressively increasing distances from the plate B'. As shown, the coupling element G comprises a gear 13 larger in diameter than the pinion 2 forming a part of the clutch assembly unit F. As shown, the gear 13 of the coupling unit G is spaced away from the plate B' by an interposed collar or spacer 16. The said gear 13 is connected to a small gear 15 by a collar 14. The gear 15 is in mesh with the gear 1 of the clutch assembly unit F'.

The coupling elements G', G², and G³ have their gears 13 respectively in mesh with the pinion elements 2 of the clutch assembly units F', F², and F³, respectively. The small gear portions 15 of the coupling units G', G², and G³ are in mesh with the gear elements 1 of the clutch assembly units F², F³, and FA, respectively.

In the arrangement shown, each of the gears 13 is of a diameter which is double the diameter of the pinion 2 with which said gear is in mesh. Each of the gears 15 has a diameter which is half that of the gear 1 in mesh with the gear 15. With the gear diameters proportioned as just described, each intermediate gear 1 rotates with an angular velocity which is only one-fourth of the angular velocity of the adjacent gear 1 at its right side, and is four times the angular velocity of the adjacent gear 1 at its left side. In consequence, if the paper feeding mechanism driven by the output gear 12 directly, or at a reduced speed, advances the record strip one inch per minute when the spring 3' of the unit FA is clutched to and rotates the shaft D, the record strip will be advanced at the speeds per minute of 4 inches, 16 inches, 64 inches or 256 inches, accordingly as the shaft D is clutched to the clutch assembly unit F³, F², F' or F, respectively.

Figure 2:
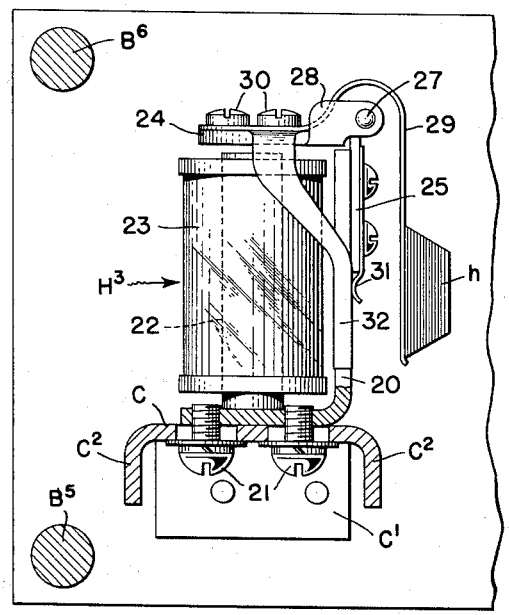
Fig. 2 is a section on line 2—2 of Fig. 1 showing one of a plurality of similar relay elements included in the mechanism shown in Fig. 1.

Whether the shaft E is clutched to one or another of the clutch assembly units F, F' F², and F³, will depend upon whether one or another of grooved wheels 6 of the units F, F', F², and F³ is subjected to the braking action of a corresponding one of four relay elements H, H', H², and H³. Those four relay units can be and, as shown, are duplicates of one another. The unit H³ is shown in Fig. 2. It comprises an electro-magnetic relay including a metal bar 20 having a lower end portion secured against the flat upper side of the support C by screws 21. The body portion of the member 20 is bent to extend vertically away from the horizontal end portion engaged by the screws 21. Extending upwardly from the support C, is a vertical core 22 having its lower end welded or otherwise appropriately connected to the horizontal lower end portion of the bar 20. The core 22 is surrounded by a solenoid 23. The body portion of the bar 20 extends alongside the solenoid 23 to or above the upper end of the latter, and cooperates with a movable armature 24 and the core 22 to form a substantially continuous circuit of magnetic metal.

The upper end of the body portion of the bar 20 is screw connected to a part 25 which terminates at its upper end in a pair of horizontal extending ears 26, as is shown in Fig. 1. The ears 26 are connected by pivots 27 to ear portions 28 of the armature 24. The ear portions 28 overlap the ear portions 26, as is plainly shown in Fig. 1. A bent strip of spring metal 29 comprises a horizontal portion clamped against the armature by screws 30, an intermediate elbow portion, and an elongated vertical portion alongside the body portion of the body 20. Attached to the side of the lower portion of the bar 29 facing away from the solenoid, is a braking body $h$ which may well be made of cork and which is tapered for contact with the tapered walls of the peripheral groove in the corresponding wheel 6, as is shown in Fig. 1.

The unit including the armature 24 and spring 29 is biased to hold the braking element $h$ out of engagement with the corresponding wheel 6 when the solenoid forming a part of the relay is not energized. As shown, the biasing means comprises a spring 31 connecting a lower portion of the bar 20 to a depending bent arm 32 integrally connected at its upper end to the armature 24.

Figure 3:
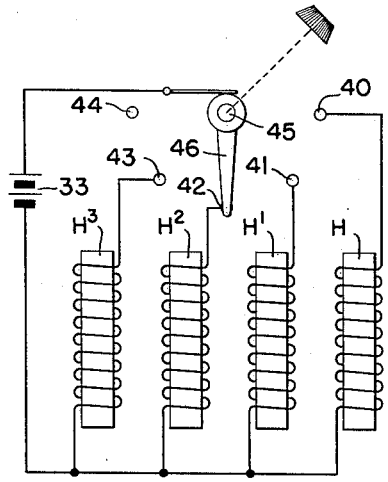
Fig. 3 is a circuit diagram illustrating the manner in which the transmission output speed may be given its different values.

Means are provided for selectively energizing one or another of the different solenoids 23, when one or another of the four higher transmission output speeds is desired. As diagrammatically shown in Fig. 3, the solenoids of the different relays H, H', H², and H³ each have one terminal connected to a source of direct current 33 and have their other terminals individually connected to switch contact studs 40, 41, 42, and 43, respectively. As shown, said contact studs and a fifth stud 44 are arranged along an arc extending circularly about a pivot 45 for a manually adjustable switch arm 46. The latter has its pivoted end electrically connected to the second terminal of the battery 33. The free end of the switch arm 46 is adapted to successively engage the studs 41-44 as the arm 46 is turned in the clockwise direction away from the position in which it engages the stud 40 into the position in which it engages the stud 44.

As has been explained, when the shaft D is clutched to any one of the units F, F', F², and F³, the shaft D is rotated at the angular speed of that unit. When the switch arm 46 is moved into engagement with any one of the studs 40 to 43, the resultant clutching action is normally completed before the corresponding clutch spring has made more than a quarter of a revolution. When the switch arm 46 is moved out of engagement with any one of the last mentioned studs, the clutch connection between the shaft D and the previously tightened spring 3 is quickly interrupted, as the tension of said spring almost instantaneously advances the corresponding wheel 6 angularly with respect to the pinion 2 to which the other end of the spring is connected.

During the periods in which one or another of the units F, F', F², and F³ is clutched to and rotates the shaft D, the latter turns freely within the spring 3' of the unit FA, since the differential between the rotary speed of the shaft D and of the spring 3' is then in the direction tending, by its frictional contact with that spring, to expand the convolutions of the latter and thus minimize the contact friction between the shaft D and spring 3'. However, when the switch arm 46 is moved into engagement with the stud 44, so that each of the relays H, H', H², and H³ is deenergized, the clutch spring 3' becomes operative to rotate the shaft D at the speed of rotation of the gear 1 and part 2' of the unit FA, as soon as the shaft offers significant frictional resistance to the angular movement of the spring 3' relative to the shaft D in the direction in which the spring 3' is constantly rotated.

With the described arrangement, the various clutch springs 3 and 3' are quite promptly and positively brought into and out of their respective clutching conditions. In consequence of the quick and positive initiation and interruption of the clutching actions of the different springs 3 and 3', the latter and the shaft D are subjected to relatively little wear. The fact that the clutch assembly elements F, F', F², and F³ are duplicates of one another, and that the various coupling elements G, G', G², and G³ are duplicates of one another, and that the relays H, H', H², and H³ are also duplicates of one another, facilitates the assemblage, repair and replacement of parts, and contributes to a relatively low cost of construction of the variable speed transmission disclosed.

While the clutch assembly unit FA is specifically different in mode of operation and structure from each of the units F, F', F², and F³, the unit FA may be replaced by a unit like the units F, F', F², and F³ without change in the operating result of the transmission. For example, if the replacing unit had its solenoid connected between the negative side of the battery 33 and switch stud 44 of Fig. 3, the adjustments of the switch arm 46 into engagement with the different studs 40-44 would produce the same output speed changes as the same adjustments produce without the apparatus collectively shown by Figs. 1-7.

It will be noted that the relative values of the different transmission output speeds may be varied by changing the relative diameters of any pair of meshing gears mounted one on the shaft D and one on the shaft E.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a variable speed transmission, the combination with a rotatable shaft, of first and second clutch assembly units mounted on longitudinally displaced portions of said shaft and each comprising a gear element, a wheel element and a helical spring element surrounding different longitudinal sections of said shaft, each spring element extending between and having its ends connected to the gear and wheel elements of the same unit, and having its convolutions proportioned and disposed to permit free rotation of the element about said shaft when the spring element is unstrained and to grip and rotate said shaft when the wheel element is subjected to a braking force causing a lagging angular displacement of the wheel element relative to the gear element of the unit and thereby tightening and reducing the diameters of said convolutions, means for rotating the gear element of the first unit, speed reducing gearing connecting the gear elements of the two units and causing the rotative speed of the second unit to rotate in the same direction as but at a lower speed than the first unit, and means selectively operable to retard the rotative movement of one or the other of said wheels and thereby cause said shaft to be clutched and rotated by one or the other of said units.

2. Apparatus as specified in claim 1, including a third unit mounted on said shaft and comprising a third gear and a third helical spring element surrounding said input shaft and having its convolutions so proportioned and disposed that when unstrained, the internal diameter of the last mentioned convolutions is less than the external diameter of said shaft, and means for rotating said third unit at a speed lower than the rotative speed of said second unit, whereby when the rotative speed of said third unit tends to exceed the rotative speed of said shaft the last mentioned convolutions frictionally grip and rotate said shaft, and when said shaft is being rotated at a higher angular speed than said third unit, the frictional contact of said shaft with said third spring element tends to expand the convolutions of the latter and thus permits said shaft to rotate within and relative to said third spring element.

3. In a variable speed transmission, the combination with a rotatable shaft, of high and low speed clutch assembly units mounted on longitudinally displaced portions of said shaft, said high speed unit comprising a gear element, a wheel element, and a helical spring clutch element, respectively surrounding different longitudinal sections of said shaft, said spring element extending between and having its ends connected to said gear and wheel elements and having its convolutions proportioned and disposed to permit free rotation of the element about said shaft when the spring element is unstrained and to grip and rotate said shaft when said wheel is subjected to a braking force straining said clutch element and causing a lagging angular displacement of the wheel relative to the gear element and thereby tightening and reducing the internal diameter of said convolutions, means for continuously rotating the gear element of said high speed unit, and thereby causing it to grip and rotate said shaft element when the rotation of said wheel is retarded, said low speed unit comprising a gear element and a helical spring clutch element surrounding said shaft and having one end connected to the last mentioned gear element and having its other end free to move angularly relative to the last mentioned gear element, and having its convolutions proportioned and disposed so that when the last mentioned spring element is unstrained the internal diameter of its convolutions is smaller than the external diameter of said shaft, speed reducing gearing connecting the gear elements of said high and low speed units and causing the low speed unit to rotate in the same direction as but at a lower speed than the high speed unit, means operable to retard the rotative movement of said wheel and thereby cause the helical spring element of said high speed unit to clutch and rotate said shaft, whereupon the frictional contact of said shaft with the third spring element of said low speed element increases the internal diameter of the convolutions of the latter, and whereby when said wheel is not retarded, the high speed unit does not grip and rotate said shaft, and the latter is gripped and rotated by the spring element of said low speed unit.

4. In a variable speed transmission, the combination with a rotatable shaft, of a series of clutch assembly units mounted on longitudinally displaced portions of said shaft, each of said units comprising a gear element, a wheel element, and a helical spring element surrounding different longitudinal sections of said shaft, the spring element of each unit extending between and having its ends connected to the gear and wheel elements of that unit, each spring element having its convolutions proportioned and disposed to permit free rotation of the element about said shaft when the spring element is unstrained and to grip and rotate said shaft when the corresponding wheel element is subjected to a braking force causing a lagging angular displacement of the wheel element relative to the gear element of the unit and thereby tightening and reducing the diameters of said convolutions, means for rotating the gear element of the first unit of the series, speed reducing gearing connecting the gear elements of each intermediate unit in the series, whereby each unit of the series is rotated at higher and lower speeds than the adjacent units, respectively at its opposite sides, and means selectively operable to retard the rotative movement of one or the other of said wheels and thereby cause the shaft to be clutched and rotated by the helical spring of one or another of said units.

5. A variable speed transmission as specified in claim 4, in which the said rotatable shaft constitutes a transmission input shaft, and which includes a transmission output shaft parallel to said input shaft, and in which each of said speed reducing gearings is mounted on said output shaft and comprises two gear elements connected for rotation at the same angular speed and having different diameters and in mesh, one with a gear element of one unit mounted on said input shaft and the other with a gear element of a second unit mounted on said input shaft.

References Cited in the file of this patent

UNITED STATES PATENTS

| Number | Name | Date |
|--------|------|------|
| 532,162 | Lindsay | Jan. 8, 1895 |
| 677,872 | Locke | July 9, 1901 |
| 822,496 | Waugh | June 5, 1906 |
| 1,141,030 | Wooldridge | May 25, 1915 |
| 1,836,199 | Starkey | Dec. 15, 1931 |
| 1,843,523 | Starkey | Feb. 2, 1932 |
| 1,861,931 | Moldenhauer | June 7, 1932 |
| 2,551,739 | Harlan | May 8, 1951 |
| 2,571,232 | Gorske | Oct. 16, 1951 |